(12) United States Patent
Hyde

(10) Patent No.: US 7,501,944 B2
(45) Date of Patent: Mar. 10, 2009

(54) ACTIVATION OF TRACKING DEVICE

(75) Inventor: Dominic Hyde, Kent (GB)

(73) Assignee: Envirotainer AB, Knivsta (SE)

( * ) Notice: Subject to any disclaimer, the term of this patent is extended or adjusted under 35 U.S.C. 154(b) by 245 days.

(21) Appl. No.: 10/541,357

(22) PCT Filed: Jan. 8, 2003

(86) PCT No.: PCT/SE03/00011

§ 371 (c)(1),
(2), (4) Date: Jan. 23, 2006

(87) PCT Pub. No.: WO2004/063766

PCT Pub. Date: Jul. 29, 2004

(65) Prior Publication Data

US 2006/0152357 A1    Jul. 13, 2006

(51) Int. Cl.
*G08B 1/08* (2006.01)
(52) U.S. Cl. .............. 340/539.13; 340/572.1; 340/988; 340/825.49; 340/10.5
(58) Field of Classification Search .......... 340/572.1, 340/572.3, 988, 438, 825.49, 10.5, 10.51, 340/10.36, 40.49, 539.13
See application file for complete search history.

(56) References Cited

U.S. PATENT DOCUMENTS

| | | | |
|---|---|---|---|
| 6,281,797 B1 * | 8/2001 | Forster et al. | 340/572.3 |
| 7,019,683 B2 * | 3/2006 | Stevens et al. | 342/28 |
| 7,072,668 B2 * | 7/2006 | Chou | 455/456.1 |
| 7,198,227 B2 * | 4/2007 | Olin et al. | 244/118.1 |
| 7,253,731 B2 * | 8/2007 | Joao | 340/539.13 |
| 2001/0052850 A1 | 12/2001 | Zimmerman | |
| 2002/0017989 A1 | 2/2002 | Forster et al. | |
| 2002/0057192 A1 | 5/2002 | Eagleson et al. | |

FOREIGN PATENT DOCUMENTS

EP    0984418    3/2000

* cited by examiner

*Primary Examiner*—Daniel Wu
*Assistant Examiner*—Edny Labbees
(74) *Attorney, Agent, or Firm*—Young & Thompson

(57) ABSTRACT

A tracking device obtains container position information, which is communicated wirelessly to a remote site. It is determined if the container is in proximity to an aircraft by detection of electromagnetic fields, and if so, the communication is disabled. Re-enabling of the communication is allowed if simultaneously no electromagnetic fields are detected and the tracking device is able to determine a container position. Re-enabling is also allowed if the lack of characteristic electromagnetic fields has lasted for a time period exceeding a predetermined value. This predetermined value is preferably larger than a maximum flight time from a globally most remote flight position. Alternatively, the predetermined value is larger than a maximum flight time on battery backup. The positioning information is preferably performed using GPS positioning. The detection comprises detection of electromagnetic field frequencies in the range of 400 Hz.

14 Claims, 4 Drawing Sheets

ACTIVATION OF TRACKING DEVICE

TECHNICAL FIELD

The present invention relates in general to container tracking devices and in particular to such tracking devices for aircraft containers equipped with proximity detectors.

BACKGROUND

Today, aircraft transports huge amounts of goods. Although the reliability and safety concerning the shipments generally is good, a part of the goods will always be misrouted or stolen. Many shipping companies provide various types of additional shipping service for goods and materials. One possibility is to place tracking information on the container housing the shipped goods so that the container can be tracked during shipment at various points. This allows the shipping company to determine the last geographic location of the container as it moves between the origination and destination points and to monitor whether the goods inside the container are on time, late, or somehow misplaced. However, such systems still rely on manual operations to certify the shipment.

In order to provide a more continuous and reliable, containers can be provided with a tracking device. The tracking device automatically determines the position of the shipment container, intermittently or continuously. Preferably, the tracking device also comprises a remote communication equipment. This enables the tracking device to report the container position to a remote site. In such a way, the shipping company will be able to follow the shipment continuously and immediately detect any delays or misrouting. One example of such a tracking system is disclosed in the published international patent application WO 0175700.

Most remote communication equipments are based on communication via electromagnetic signals in the radio frequency range. Unfortunately, emission of radio frequency electromagnetic signals may interfere with vital systems in the aircraft, such as navigation and communication systems. In order to insure undisturbed operation of such systems, different aviation administrations have issued restrictions on use of certain electronic devices emitting radio frequency electromagnetic signals on an aircraft during its operation.

In order to follow such restrictions, container tracking devices are provided with proximity detectors, which detects if the container is in the vicinity of a transport vessel, in particular an aircraft. If the proximity to an aircraft is detected, the radio-frequency electromagnetic signal emitters in the tracking devices are deactivated, in order not to disturb the aircraft system. There are many different possible proximity detectors. Some of them are described in U.S. Pat. No. 6,281,797.

The most attractive proximity detector approach is to detect the occurrence of a 400 Hz electromagnetic field. Aircrafts in general has a main electrical distribution system that operates with a higher frequency—around 400 Hz—than used in a normal domestic power system. The main electrical distribution system gives rise to an emission of an electromagnetic field, which radiates out throughout the aircraft. If a container is brought into vicinity of a powered aircraft, the proximity detector will detect a 400 Hz electromagnetic field. In response to such detection, the radio-frequency electromagnetic field emitting devices, e.g. the radio communication means, are deactivated.

When the container is brought out from the aircraft, the 400 Hz electromagnetic field will disappear again, and the radio communication can be re-established.

A problem with this approach appears in cases where the main power system of the aircraft ceases to operate during a flight. In such a case, the power supply of the aircraft functions switches over to a battery operation. This battery backup is sufficient to supply the vital functions until the aircraft reaches the closest airport. Emissions from a direct current power system are uniform and cannot be distinguished. A prior-art proximity detector will in such a case notice a disappearance of the 400 Hz electromagnetic signal and will interpret this as if the container has left the a cargo room of the aircraft. Radio-communication from the tracking device will be allowed, which may disturb the aircraft systems, which already are put into an emergency operation.

SUMMARY

A general object of the present invention is to provide for a proximity detector system and methods therefore having a higher safety level. A further object of the present invention is to provide a proximity detector and methods therefore that in a more accurate manner are able to determine when a container, to which the proximity detector is associated, leaves an aircraft.

The above objects are achieved by devices and methods according to the enclosed patent claims. In general words, a tracking device obtains container position information, which is communicated wirelessly to a remote site. It is determined if the container is in proximity to an aircraft by detection of electromagnetic fields, and if so, the communication is disabled. According to the present invention, re-enabling of the communication is allowed if simultaneously no electromagnetic fields are detected and the tracking device is able to determine a container position. Re-enabling is also allowed if the lack of characteristic electromagnetic fields has lasted for a time period exceeding a predetermined value. This predetermined value is preferably larger than a maximum flight time from a globally most remote flight position. Alternatively, the predetermined value is larger than a maximum flight time on battery backup.

In preferred embodiments the positioning information is performed using GPS positioning. The detection comprises preferably detection of electromagnetic field frequencies in the range of 400 Hz.

With the present invention, communication will not be allowed even in the case of main power system failure. Furthermore, a maximum precautionary disabling time ensures that erroneous disabling is held as short as possible.

BRIEF DESCRIPTION OF THE DRAWINGS

The invention, together with further objects and advantages thereof, may best be understood by making reference to the following description taken together with the accompanying drawings, in which:

FIG. 3A is a block diagram of a proximity detector usable together with the present invention;

DETAILED DESCRIPTION

Figure 1:
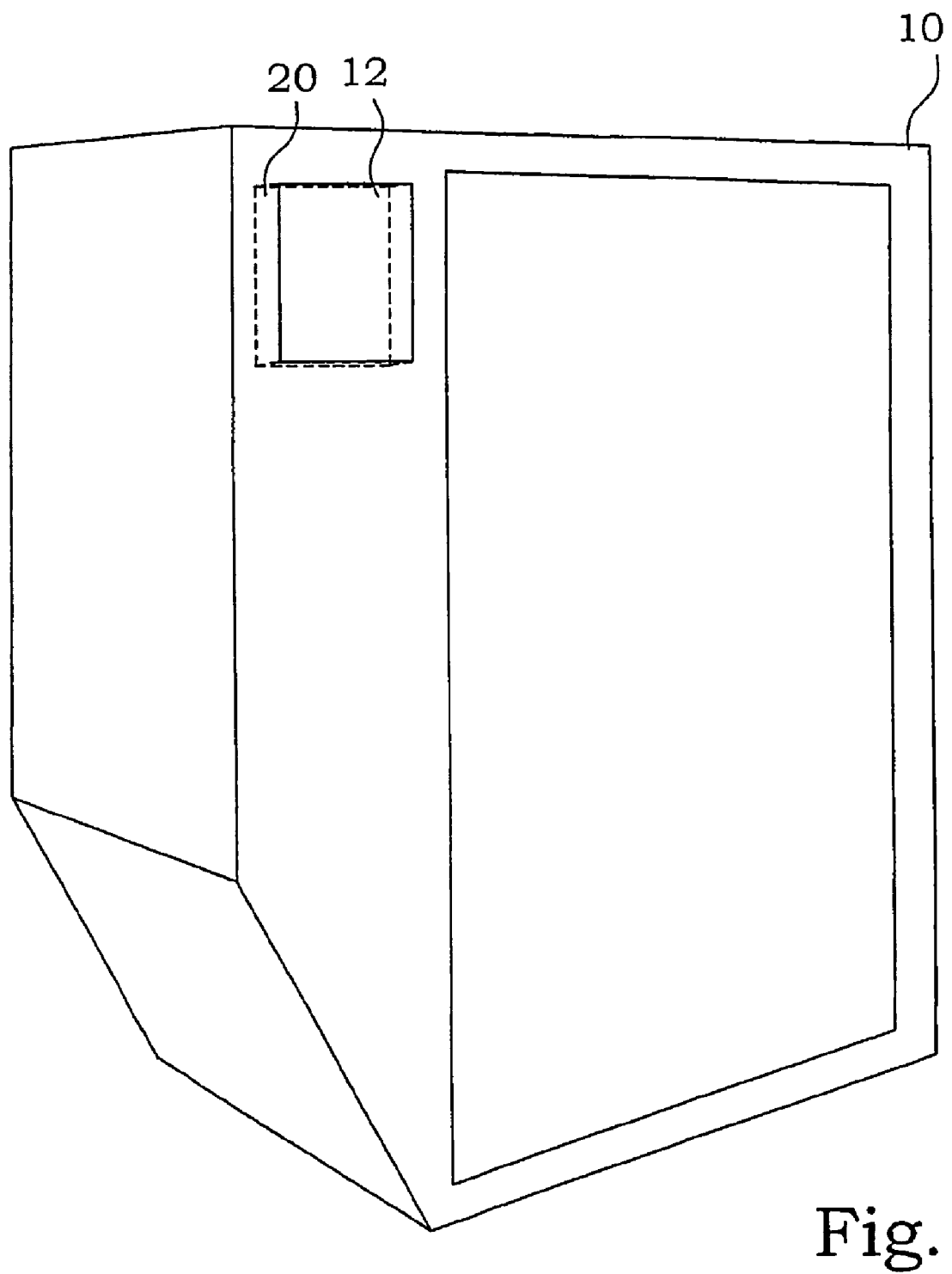
FIG. 1 is a perspective view of an airfreight container having a tracking device according to an embodiment of the present invention.

FIG. 1 illustrates a freight container 10 that is commonly used for airfreight. The shape of the container 10 is adapted to fit into the cargo department of an aircraft. The container 10 is provided with a tracking device 20. This tracking device is in this embodiment fitted into a sidewall of the container 10, and is covered by lid 12 to protect the tracking device 20 from external mechanical damage during e.g. loading procedures. The lid 12 also enables exchange of batteries for operation of the tracking device 20, and for allowing exchange or repair of broken parts of the tracking device 20.

Figure 2:
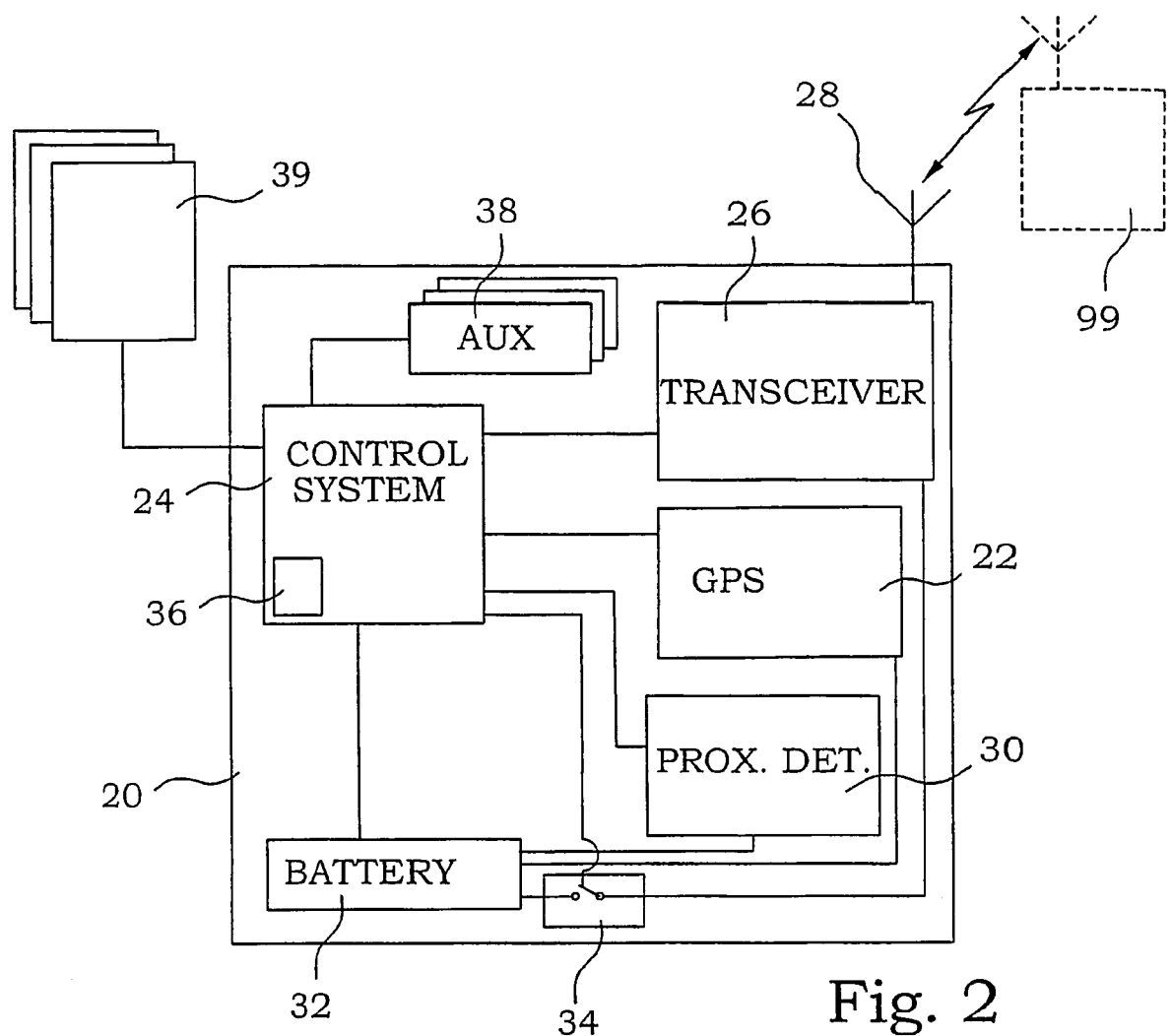
FIG. 2 is a block diagram of a tracking device according to an embodiment of the present invention.

FIG. 2 shows a schematic block diagram of an embodiment of a tracking device according to the present invention. A position determination device 22 is arranged for receiving external signals for determination of the position of the tracking device 20 and hence of the container 10. Preferably, the position determination device 22 operates using the global positioning system GPS. The GPS receiver receives electromagnetic signals from a number of earth-stationary satellites. The signals are emitted from the satellites in a highly synchronised manner, and the respective arrival times to the GPS receiver is thereby indicative of the distance to the satellite. By having access to at least three satellite signals, if the GPS has access to a common time reference, or at least four satellites otherwise, an absolute position can be determined with a high accuracy. The actual operation of a typical GPS application is well known and for details about GPS position determination, there is a large amount of literature describing such systems. Since the actual procedure of determining a position is of minor importance for the present invention, references are made to standard literature in this field of technology.

If the position determination device 22 has access to sufficient number of satellite signals, the position determination device 22 outputs data associated with a position to a control system 24. The control system 24 is the main processing unit within the tracking device 20. The control system 24 collects the position information and at certain occasions, e.g. intermittently, or when a significant change in position is detected, the control system 24 performs a report of the present situation to a remote site. The remote site is preferably in informational contact with the one handling the shipment. The control system 24 then creates an amount of information, which is passed onto a transceiver unit 26. The transceiver unit 26 is arranged to transmit the information by wireless communication from an antenna 28 to a remote site 99. The transceiver unit 26 is hence, a remote communication device. Preferably, the communication is performed using radio frequency electromagnetic signals. Such transceiver units 26 and antennas 28 are common within all types of communication technology and are therefore not further discussed. However, it should here be noted that the transceiver unit 26 and the antenna 28 produces electromagnetic signals that may interfere with e.g. vital systems of an aircraft, i.e. they are examples of so-called field-emitting devices.

In order to prohibit such an interference with the aircraft systems, the tracking device 20 is provided with a proximity detector 30. The proximity detector 30 senses proximity of an aircraft, and if proximity is detected, a signal is outputted to the control system 24 to inform the control system 24 that detection has occurred. As a response to such detected aircraft proximity, the control system 24 modifies its behaviour accordingly, i.e. basically stop trying to send messages. In one embodiment, the control system 24 may perform a disabling of any radio signal emission from the tracking device 20, in particular the transceiver unit 26.

In an alternative embodiment, a part of the system functionality can be located directly in or in connection to the proximity detector 30, and the disabling of the radio signal emission is then performed directly from the proximity detector. In such an embodiment, the control system 24 is a distributed means, having one portion thereof integrated together with the proximity detector.

In the present embodiment, a battery unit 32 powers the tracking device 20. All subsystems receive their power from this battery unit 32. At the power supply connection between the battery unit 32 and the transceiver unit 26, a switch 34 is provided. The switch 34 is arranged in such a way that the power is connected to the transceiver unit 26 only if the control system 24 provides a connect signal to the switch 34 through a control connection. If the control system 24 receives an indication of that the container is situated close to an aircraft, the control system 24 will omit the connect signal to the switch 34, and the power to the transceiver unit 26 will be disabled. The transceiver unit 26 will in such a situation be unable to emit any radio-frequency signals. Also if the control system 24 itself will fail, the connect signal will disappear and a precautionary disabling of the transceiver is performed.

Since the entrance of a container into the cargo compartment of an airfreight takes place fairly slow, the response to a proximity detection does not have to be immediate. This also opens up for avoiding disabling of the transceiver if temporary false detections will appear. In the present embodiment, the control system 24 also comprises a timer means 36. By delaying the disabling of the transceiver for a predetermined period of time and keep track if the proximity signal is present during the entire period, temporary false proximity signals will not give cause to any transceiver disabling. Effects of background noise in the frequency range detected by the proximity detector 30 can thus be excluded.

In the earlier discussed embodiment using a distributed control system 24, the timer means 36 is preferably located in connection with the proximity detector 30, facilitating the control of the power supply to the transceiver.

Anyone skilled in the art realises that the disabling of the transceiver can be realised in many other different manners. The control system may e.g. internally discard any transmission instructions sent to the transceiver unit 26. Moreover, instructions to the transceiver to refrain from emitting registration and control information are issued. In such an embodiment, the transceiver will be continuously powered, but since no transmissions are ordered, the transceiver unit will be silent.

In the present embodiment, the tracking device 20 is also provided with a number of auxiliary detector units 38, which is arranged for measuring e.g. temperature, humidity and pressure within the container. Such container information is stored in the control system 24 and important parts of this information may also be part of the information sent to the remote site 99. In such a way, the shipper may keep track not only of the position of the container, but also of the internal conditions within the container. The auxiliary detector units 38 may also detect e.g. if the container shell is damaged, if the container doors are opened etc., to provide for theft protection.

The tracking device 20 may also through the transceiver unit 26 receive instructions from the remote site 99. These instructions are received by the control system 24 and the control system 24 may in response perform control actions on a number of conditioning means 39, e.g. a heater element, cooling equipment or a humidity control device. In such a way, the shipper may influence the internal container conditions through the remote site 99.

FIG. 3A illustrates an embodiment of a proximity detector 30 according to the present invention. The proximity detector 30 operates based on detection of electromagnetic signals, i.e. it is an electromagnetic field sensor. In aircrafts, a main power supply system operates at a frequency of around 400 Hz. By using this higher frequency (compared to the ordinary 50 Hz or 60 Hz systems), the dimensions of the electrical components can be reduced, which means that the total weight of electric equipment may be reduced significantly. The 400 Hz power system radiates an electromagnetic field having the same frequency, i.e. 400 Hz. This frequency can easily be detected throughout the entire aircraft, and may thereby be used as a simple detection of proximity of an aircraft.

Electromagnetic fields having a significant 400 Hz component may be present also at other locations, but such fields are typically very weak and local and it is not very likely that a freight container will be placed in the vicinity of such other 400 Hz electromagnetic field sources. The 400 Hz electromagnetic field is thereby a very attractive signal to base a proximity detector on.

The proximity detector 30 of the present embodiment comprises three pick-up coils 40, 42, 44 arranged at three perpendicular directions. Since the pick-up coils 40, 42, 44 sense the electromagnetic field component in one direction each, an electromagnetic field will be sensed by at least one pick-up coil regardless of direction. The pick-up coils 40, 42, 44 give rise to an electrical signal corresponding to the sensed electromagnetic field. The three picked-up components are quadratically summed in a summer unit 46 to achieve a true measure of the total intensity of the electromagnetic field strength. The pick-up coils are tuned to the frequency of 400 Hz in order to be particular sensitive to that frequency. The summed signal is amplified in an amplifier 48 and passed onto a filter 50. In the filter 50, noise is removed and the filtered signal is eventually forwarded to a threshold means 52. In the threshold means 52, the conditioned signal is compared with a predetermined threshold, and if the signal is higher than the threshold, the signal is interpreted as representing proximity detection.

Figure 3B:
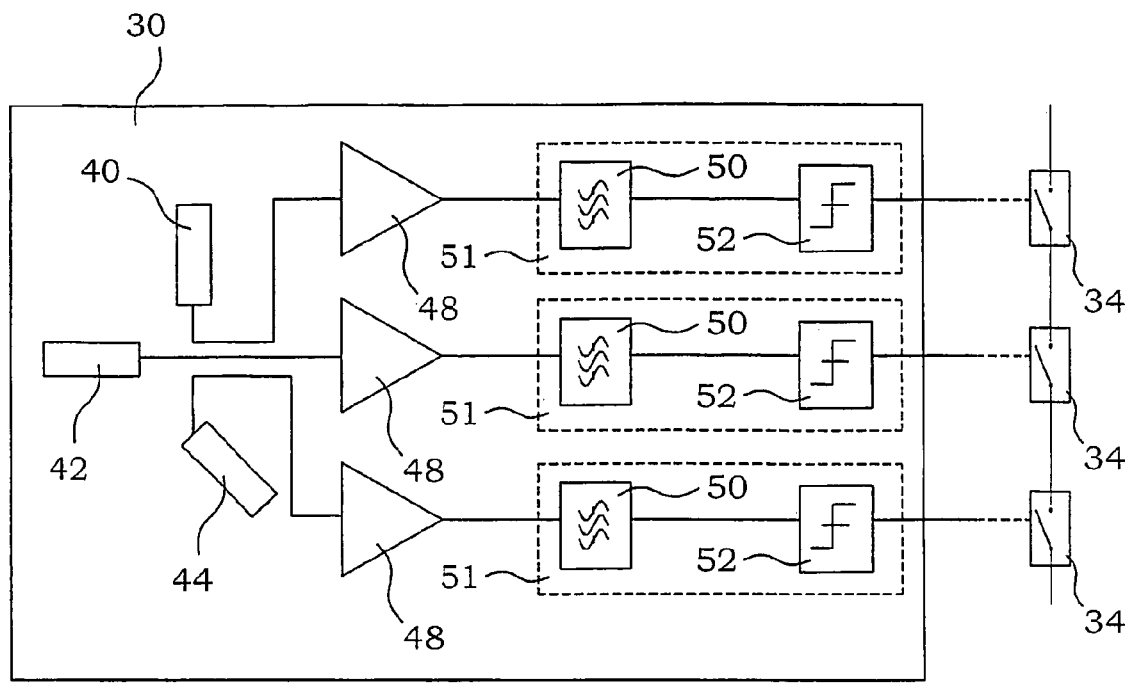
FIG. 3B is a block diagram of another proximity detector usable together with the present invention.

Another embodiment of a proximity detector 30 according to the present invention is illustrated in FIG. 3B. In this embodiment, the outputs of the three coils 40, 42, 44 are conditioned separately, giving one control signal each. Each of these signals can be used to control a respective one of three serially connected power switches for the transceiver. This arrangement gives an increased redundancy, which leads to improved reliability of the detector. In this embodiment, the functionality of the filter 50 and threshold detector 52 are comprised by a single tone decoder chip 51, e.g. LM567/LM567C available form National Semiconductor Corp.

In a further development of this embodiment, the separate detection circuits can be multiplexed, such that only one detection circuit at a time is operating. If this multiplexing is performed with an appropriate speed, power consumption is reduced to ⅓ without reducing the reliability of the detection.

Figure 4:
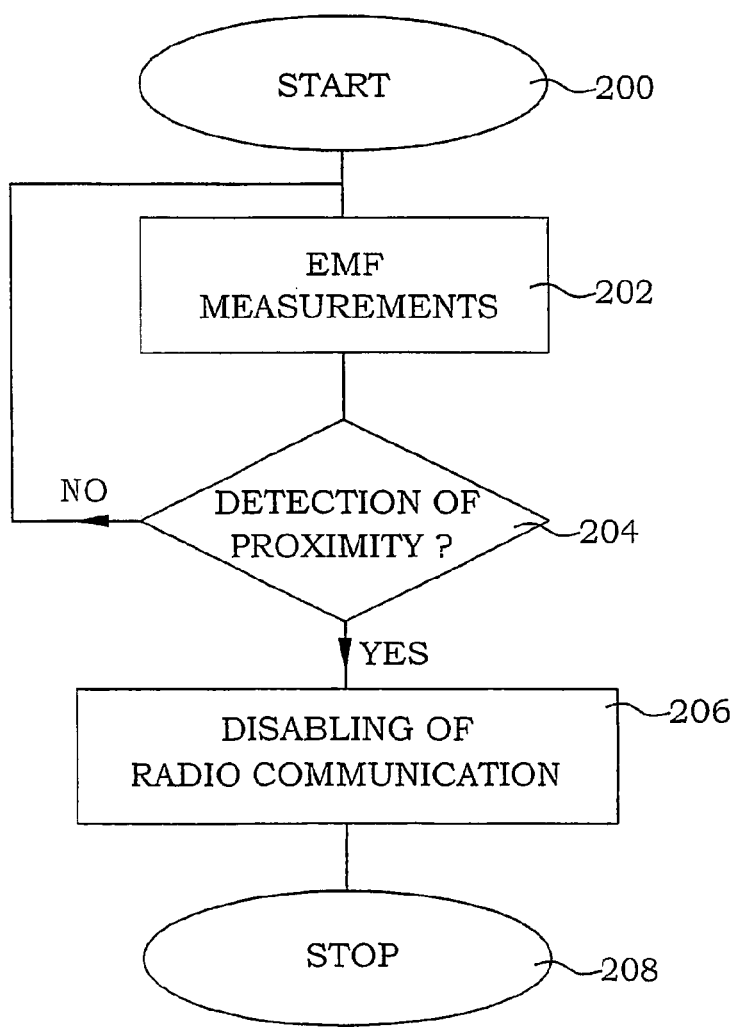
FIG. 4 is a flow diagram of a simple deactivation procedure in a tracking device.

If a tracking device 20 is fully operating, including transmission of signals to the remote site, it has to be deactivated when entering an aircraft. FIG. 4 illustrate a flow diagram corresponding to a typical deactivation procedure for a device comprising a proximity detector based on measurements of electromagnetic fields. The procedure starts in step 200, where the initial state is assumed to be an enabled radio-communication. In step 202, electromagnetic fields of a certain frequency or frequency band are measured. In step 204, it is decided whether or not the detected field strength indicates proximity to an aircraft. If the measured electromagnetic field is too weak, no proximity to an aircraft is assumed to be present and the procedure is repeated from the beginning. If the measured electromagnetic field exceeds a certain threshold, proximity to an aircraft is assumed and the procedure continues to step 206. In step 206, the radio-frequency emitting parts of the tracking device are disabled in one or the other way. The procedure ends in step 208.

Such a disabling procedure is relatively straightforward. As long as the proximity detector is operating properly, a tracking device being brought close to an aircraft with its main power supply system turned on will detect a 400 Hz electromagnetic field of sufficient strength. If the container is brought into the aircraft while the main power system is turned off it will not detect the proximity, but as soon the main power system is turned on again, detection is made and any interfering radio communication can be switched off. Also, the probability that a sufficiently strong 400 Hz electromagnetic field that a container may experience will origin from an aircraft is relatively high. This means that the ratio of false proximity detections in a typical case is very low. The disabling procedure is thus quite straightforward using the 400 Hz electromagnetic signal.

The initial state of the tracking device 20 should be "aboard an aircraft". This means that, when the tracking device is turned on, the unit automatically assumes that it is aboard and it has to prove it is not before any transmission can commence. However, as mentioned in the background, such enabling procedure is more complex than the above described disabling. An aircraft has backup systems for main power. The ultimate backup is based on a DC-system powered by batteries. This system is dimensioned to handle an emergency flight from any location around the globe to the closest airport capable of receiving such an aircraft. A DC power system does not give rise to any electromagnetic fields, and the proximity detector will indicate a loss of proximity. However, a re-enabling of the radio-communication parts of the tracking device may in such a situation be extremely dangerous. According to the present invention the disappearance of the electromagnetic field signal has to be combined with complementary proximity measurement approaches.

The tracking device already comprises a position determination device, preferably based on the GPS concept. The position determination is dependent on that a minimum number of satellite signals are possible to receive. When loading a container into the cargo compartment of an aircraft, the satellite signals will be strongly affected and attenuated by the aircraft shell. When being placed in an aircraft, the probability to detect sufficient number of satellite signals is vanishing. A re-enabling of the radio-communication based on a combination of a non-present 400 Hz electromagnetic field and the ability to determine a container position by the position determination means has a very high degree of security. If the 400 Hz main power system fails, the electromagnetic field will indeed disappear, but still, there is no possibility for the position determination means to determine a container position, and the radio-communication will still be disabled.

Such an approach is safe, but there are possible situations, where such an approach may lead to unnecessary precautionary disabling. For instance, if a container is loaded directly from an aircraft onto a truck, the 400 Hz electromagnetic field may be present until the container is situated well inside the truck. If the shell of the truck screens the positioning satellite signals well, it might be impossible to determine a position of the container.

The tracking device will in such a case interpret the situation as a suspect main power system failure and keep the radio-communication devices of the tracking device disabled. The truck, in turn, can be brought into other areas, where the satellite signals are not reachable, and the disabling is continued. If the container is stored for a longer time at such locations, the disabling of the container could last for very long times.

In a preferred embodiment of the present invention, the re-enabling procedure is additionally provided with a timing aspect. From the designing of DC-backup systems for aircrafts, it is known that such systems have to operate for a minimum time period, which corresponds to the maximum time it takes to fly from the most remote location on earth to the nearest airport multiplied with a safety factor. This most remote position is located at a point at the mid-Atlantic sea. This means that if the 400 Hz electromagnetic field has been gone for a time period corresponding to this minimum time period, only two alternatives exist. Either the aircraft has safely landed, and the radio communication can be re-enabled without any risks, or the aircraft has crashed, and also then, possible operating radio communication will rather be an advantage than a disadvantage.

Figure 5:
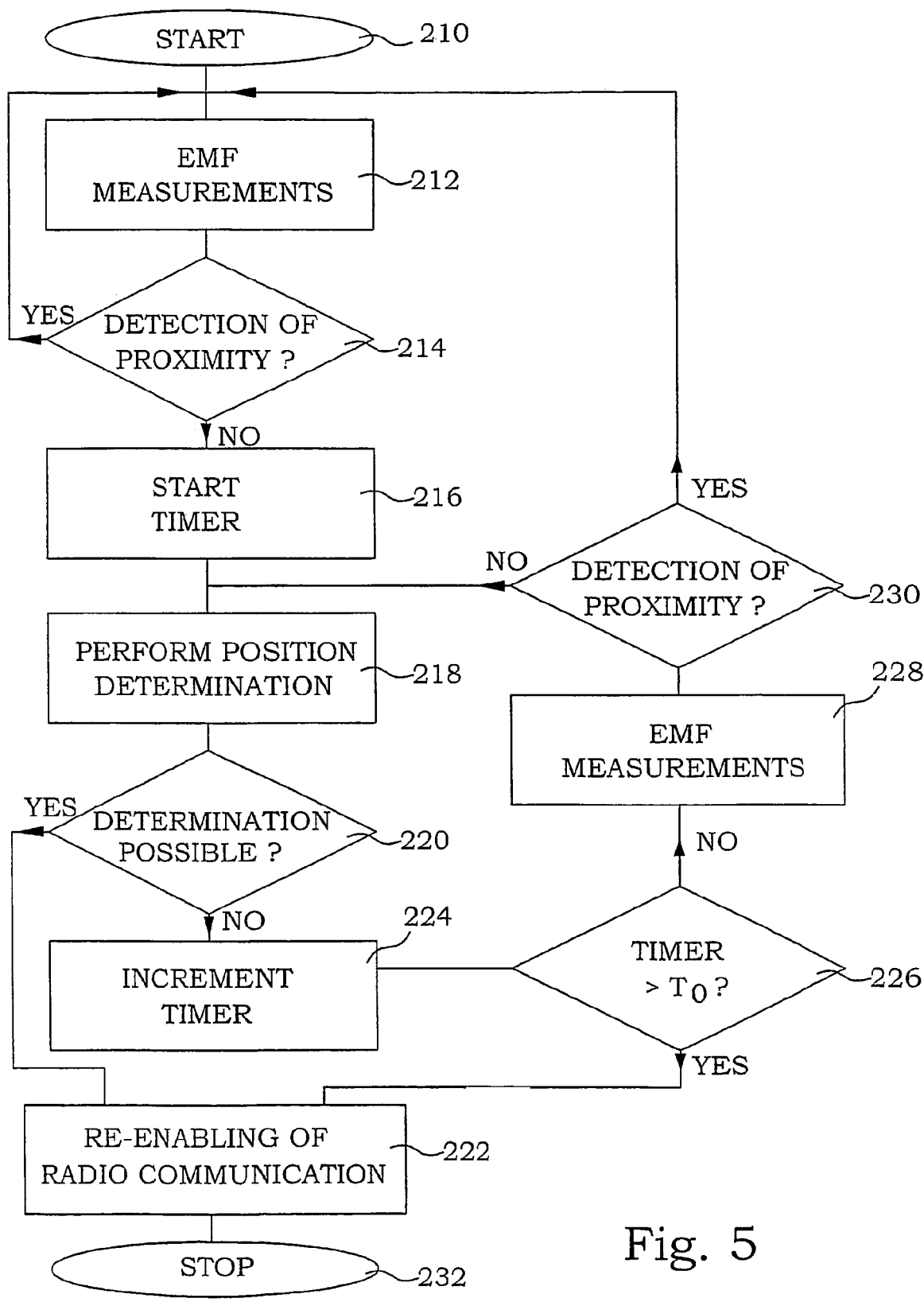
FIG. 5 is a flow diagram of an embodiment of a procedure of reactivation in a tracking device according to the present invention.

FIG. 5 illustrate a flow diagram corresponding to an embodiment of a re-enabling procedure according to the present invention. The procedure starts in step 210, where it is assumed that field-emitting parts of the tracking device are disabled. This could be due to the presence of an electromagnetic field indicating proximity to an aircraft. This state also occurs when the tracking device initially is turned on, e.g. after an internal power loss. In step 212, electromagnetic fields of a certain frequency or frequency band are measured. In step 214, it is decided whether or not the detected field strength indicates proximity to an aircraft. If the measured electromagnetic field exceeds a certain threshold, proximity to an aircraft is assumed and the procedure is repeated from the beginning. If the measured electromagnetic field is too weak, no proximity to an aircraft is assumed to be present and the procedure continues to step 216. In step 216, a timer circuit is started.

In step 218 the positioning system of the container tracking device tries to make a position determination. In step 220 it is decided if the position determination has been successful or not. If the position determination is successful, it is assumed that the container has left the aircraft, and the procedure continues to step 222, where a re-enabling of the field-emitting parts is performed. If it in step 220 instead is decided that no position can be determined due to lack of receivable positioning signals, it is assumed that the container still is in a shielded area, e.g. still in the aircraft with the battery backup power supply system running. The procedure then continues to step 224, where the timer circuit is incremented. In step 226, it is checked whether the timer circuit has reached a predetermined value or not. If the predetermined value is not reached, the procedure continues to step 228. If the predetermined value is reached, i.e. the maximum waiting time is reached, it is assumed that the container has been loaded off the aircraft and is situated in another shielded area. The procedure therefore continues to step 222, where a re-enabling of the field-emitting parts is performed, as mentioned above. The procedure is then ended in step 232. In step 228, the electromagnetic fields of a certain frequency or frequency band are again measured. In step 230, it is decided whether or not the detected field strength indicates proximity to an aircraft. As long as no proximity is detected, the timer counting will continue. However, if the measured electromagnetic field exceeds a certain threshold, proximity to an aircraft is assumed and the entire procedure is repeated from the beginning from step 212. If the measured electromagnetic field is too weak, no proximity to an aircraft is still assumed to be present and the procedure instead returns back to step 218 for trying to perform position determination and incrementing the timer circuit.

The embodiment of FIG. 5 is only one possible embodiment of the method according to the present invention. Anyone skilled in the art realises that the characteristic features of the method as defined by the claims can be achieved by different embodiments. However, the main issue is that a lack of proximity electromagnetic signal has to be accompanied either by the possibility to determine the position of the container by the positioning device or by that a precautionary time delay has been ended.

It will be understood by those skilled in the art that various modifications and changes may be made to the present invention without departure from the scope thereof, which is defined by the appended claims.

The invention claimed is:

1. Method for operating a tracking device operatively connected to a container and having at a remote communication device, comprising the steps of:
    performing a positioning information obtaining procedure concerning said container;
    sensing whether said tracking device is in proximity to an aircraft by detecting electromagnetic fields emitted by said aircraft;
    disabling emission of radio frequency signals from said remote communication device if proximity to said aircraft is indicated in said step of sensing; and
    re-enabling emission of radio frequency signals from said remote communication device only if a lack of electromagnetic fields emitted by said aircraft is established simultaneously as a positioning information obtaining procedure is successfully performed.

2. Method according to claim 1, comprising the further steps of:
    measuring a time period during which lack of proximity to the aircraft continuously is indicated in said step of sensing; and
    re-enabling emission of radio frequency signals from said remote communication device if said time period exceeds a predetermined value.

3. Method according to claim 2, wherein said predetermined value is larger than a maximum flight time from a globally most remote flight position.

4. Method according to claim 3, wherein said predetermined value is larger than a maximum flight time for said aircraft on battery backup.

5. Method according to claim 1, wherein said step of performing a positioning information obtaining procedure in turn comprises the step of determining a GPS position.

6. Method according to claim 1, wherein said step of detecting in turn comprises the step of detecting electromagnetic field frequencies in the range of 400 Hz.

7. Tracking device for remote monitoring of a container to which said tracking device is operatively connected, said tracking device comprising:
    a positioning system to obtain positioning information concerning said container;
    a remote communication device;
    a control system connected to said positioning system and said remote communication device; and a detector for sensing whether said tracking device is in proximity to an aircraft and comprising an electromagnetic field sensor, sensing electromagnetic fields emitted by said aircraft, said detector being connected to said control system, said control system being arranged to disable emission of radio frequency signals from said remote communication device responsive to an output of said detector indicating proximity to said aircraft, and said control system being arranged to re-enable emission of radio frequency signals from said remote communication device only responsive to a simultaneously established lack of an output of electromagnetic fields emitted by said aircraft and a successfully performed positioning information obtaining procedure by said positioning system being able to obtain the positioning information.

8. Tracking device according to claim 7, wherein said control system being arranged to also re-enable emission of radio frequency signals from said remote communication device responsive to a lack of an output of said detector indicating proximity to an aircraft during a time period exceeding a predetermined value.

9. Tracking device according to claim 8, wherein said control system further comprises a timer arranged to clock said time period.

10. Tracking device according to claim 8, wherein said predetermined value is larger than a maximum flight time from a globally most remote flight position.

11. Tracking device according to claim 10, wherein said predetermined value is larger than a maximum flight time on battery backup.

12. Tracking device according to 7, wherein said positioning system is a GPS system.

13. Tracking device according to claims 7, wherein said electromagnetic field sensor is arranged to sense electromagnetic field frequencies in the range of 400 Hz.

14. Container for airfreight, having tracking device for remote monitoring of said container, said tracking device comprising:

a positioning system to obtain positioning information concerning said container;

a remote communication device; control system connected to said positioning system and said remote communication device; and a detector for sensing whether said container is in proximity to an aircraft and comprising an electromagnetic field sensor, sensing electromagnetic fields emitted by said aircraft, said detector being connected to said control system, said control system being arranged to disable emission of radio frequency signals from said remote communication device responsive to an output of said detector indicating proximity to an aircraft;

said control system being arranged to re-enable emission of radio frequency signals from said remote communication device only responsive to a simultaneously established lack of electromagnetic fields emitted by said aircraft and successfully performed positioning information obtaining procedure by said positioning system being able to obtain the positioning information.

\* \* \* \* \*